United States Patent Office 3,435,611
Patented Apr. 1, 1969

3,435,611
OIL RETAINER FOR ROTARY SHAFT
Yoshiyuki Hirose and Susumu Hanaoka, Tokyo, Japan, assignors to Kabushiki Kaisha Daini Seikosha, Tokyo, Japan, a Japanese company
Filed Jan. 31, 1967, Ser. No. 612,854
Claims priority, application Japan, Feb. 2, 1966, 41/5,745
Int. Cl. G04b 31/00
U.S. Cl. 58—140           4 Claims

ABSTRACT OF THE DISCLOSURE

The pivot of a rotary shaft is rotatably supported by an apertured jewel and an end stone which is slightly spaced from the jewel and is provided with one or more small holes arranged on a circle which is smaller than the diameter of the jewel, but larger than the diameter of the hole in the jewel. Lubricating oil is retained by surface tension in the space between the jewel and the end stone and in the small hole or holes in the end stone. The space between the jewel and end stone and the diameter and location of the small hole or holes in the end stone are interrelated so that the surface tension of lubricating oil retained in the small hole or holes in the end stone and that of oil retained in the space between the end stone and the jewel are kept in balance.

---

The present invention relates to bearings for rotary shafts, and more particularly to an oil retainer for conserving the lubricating oil for a rotary shaft bearing.

With an increase of weight and the speed of rotation of a rotary shaft, the contacting parts of the shaft and its bearing need a larger amount of lubricating oil for proper lubrication. It has been found that conventional oil retainers do not satisfactorily fulfill the requirement. This is particularly true of rotary shafts in small watches, for example wrist watches, where large and complicated lubricating oil retainers cannot be used because the component parts of a watch are extremely small in size. The present invention overcomes the difficulties heretofore experienced by providing an oil retainer which meets the requirements in a simple yet highly effective manner.

Figure 1:
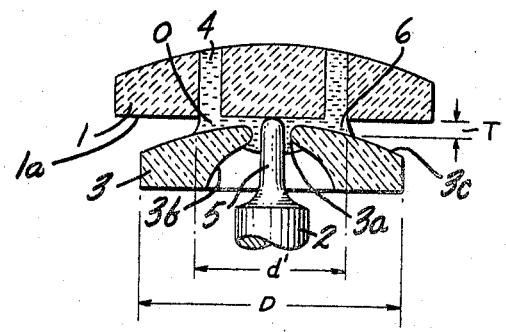
Figure 2:
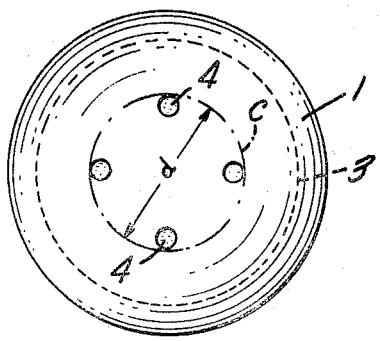
Figure 3:
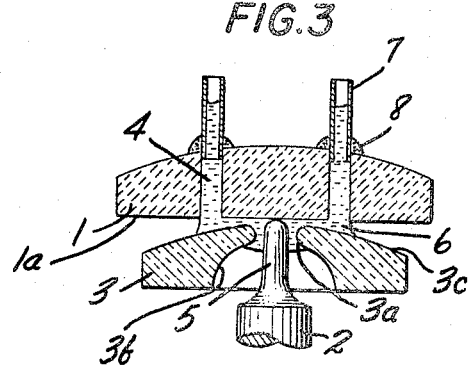

The invention will be more fully understood from the following description of preferred embodiments in conjunction with the accompanying drawings in which:

FIG. 1 is a cross sectional view of a bearing and oil retainer in accordance with the invention, FIG. 2 is a plan view of the bearing, FIG. 3 is a cross section view of another embodiment of the invention.

With reference to FIGURES 1 and 2, a rotating shaft or arbor 2 having a pivot 5 is rotatably supported by a bearing comprising a jewel 3 and an end stone 1. It will be seen that the pivot 5 extends through a hole 3a in a recessed portion 3b of the jewel 3. A rounded end of the pivot 5 engages the end stone 1. The jewel 3 and end stone 1 are slightly spaced from one another to provide a lubricating oil space 6 which is preferably somewhat divergent at its periphery by reason of the face 1a of the end stone engaged by the pivot 5 being substantially flat while the face 3c of the jewel 3 is convex. The distance between the jewel 3 and the end stone 1 is sufficiently small that lubricating oil O is retained in the space 6 by capillary action or surface tension. For example, the distance T between the jewel 3 and end stone 1 may be some hundredths of a millimeter, for example, millimeter of the order of .05 mm.

It has been found that when the weight of the rotating part is greater in proportion to the pivot size, and when its speed of rotation is higher, for example more than 5 revolutions per second, the lubricating oil in the space 6 is not sufficient and hence excessive wear of the pivot 5 of the arbor 2 may result.

In order to overcome this difficulty, the end stone 1, in accordance with the invention, is provided with one or more small holes 4, positioned approximately on a circle C having a diameter $d$ which is smaller than the diameter D of the jewel 3, but larger than the hole 3a of the jewel in which the pivot 5 is received. Preferably there are a plurality of such holes arranged on the circle C, for example 2, 3 or 4 holes, and the diameter $d$ of the circle C is preferably approximately one half the diameter D of the jewel 3.

As will be seen in FIGURE 1, the holes 4 receive lubricating oil and communicate with the space 6 between the jewel 3 and the end stone 1 so as to increase materially the amount of lubricating oil available for lubrication of the bearing.

The holes 4 and space 6 are both of capillary nature so that oil is retained in them by surface tension. If proper balance of surface tension is not maintained, oil may be drawn out of the space 6 into the holes 4 and thus away from the pivot 5, or conversely oil fed in the small holes 4 may tend to flow excessively into the space 6 and out of the periphery of the space between the end stone 1 and jewel 3 so that the oil is lost out of the bearing. For this reason, the small hole or holes 4 must be designed to maintain a balance between the surface tension of the lubricating oil fed in the small hole or holes 4 and that of the lubricating oil injected in the space 6.

In order to increase the amount of oil in the space 6, it would be desirable to make the diameter $d'$ of a circle formed by the oil in the space 6 approximately equal to the diameter D of the jewel 3. However, in this case there is danger of the lubricating oil flowing out of the periphery of the space. To avoid such occurrence it has been proposed to make the diameter $d'$ of the circle of lubricating oil very much smaller than the diameter D of the jewel 3, but in such case the amount of oil available becomes too small. Accordingly, it has been found that the relationship of $d'$ equals one half D is the most advantageous, in order to prevent lubricating oil from flowing out of the space 6 while at the same time providing adequate lubricating oil for lubrication of the bearing.

Since the surface tension of the oil in the small holes 4, and that of the oil in the space 6 between the end stone 1 and jewel 3, are substantially balanced as indicated above, the diameter $d'$ of the circle of oil in the space 6 is approximately equal to the diameter $d$ of the circle C on which the holes 4 are located. Accordingly, the relation between the diameter $d$ of the circle on which the small holes 4 are located, and the diameter D of the jewel 3 is that $d$ is approximately equal to one half D.

It has been found that a balance between the surface tension of the oil in the small hole or holes 4 and that of the oil in the space 6 can be obtained when the diameter of the small hole 4 is not less than the thickness T of the space 6 and not more than 5 time T. For example, excellent results have been obtained when T equal 0.05 mm. and the diameter of the hole 4 equals 0.20 mm.

Another embodiment of the invention is shown in FIGURE 3, in which corresponding parts are designated by the same reference numerals as in FIGURES 1 and 2. In this embodiment there is the additional provision of capillary tubes 7 attached by adhesive 8 to the end stone 1 so as to provide extensions of the small holes 4 in the end stone. The extension tubes 7 receive lubricating oil to increase still further the amount of oil available for the bearings.

Thus, the present invention makes it possible to prevent wear of the pivot or shaft of rotating parts by increasing the amount of lubricating oil available for the bearing in a very simple and yet effective manner.

While preferred embodiments of the invention have been illustrated in the drawings and are herein particularly described, it will be understood that the invention is in no way limited to these examples.

What we claim is:

1. A lubricated bearing for a pivot, comprising a jewel having a hole rotatably receiving said pivot and an end stone engaging the ends of said pivot, said end stone being spaced from said jewel such distance as to provide an oil receiving capillary space therebetween and having at least one oil-receiving reservoir hole in said end stone communicating with said space and offset from said hole in the jewel, said hole in said end stone having a diameter which throughout its length is not less than the spacing between said end stone and jewel and not more than five times said spacing, whereby said space and said hole in the end stone are proportioned to provide a balance between the surface tension of lubricating oil in said hole in the end stone and that of lubricating oil in said capillary space.

2. A lubricated bearing according to claim 1, in which said hole in the end stone is positioned on a circle having a diameter approximately half the transverse dimension of said jewel.

3. A lubricated bearing according to claim 2, in which there are a plurality of said holes in said end stone arranged symmetrically approximately on said circle.

4. A lubricated bearing for a pivot, comprising a jewel having a hole rotatably receiving said pivot and an end stone engaging the ends of said pivot, said end stone being spaced from said jewel to provide an oil receiving space therebetween and having at least one oil-receiving hole in said end stone communicating with said space and offset from said hole in the jewel, said space and said hole in the end stone being proportioned to provide a balance between the surface tension of lubricating oil in said hole in the end stone and that of lubricating oil in said space, and a capillary tube secured to the end stone and forming a extension of said hole in the end stone, thereby increasing its oil-holding capacity.

References Cited

UNITED STATES PATENTS

| 1,549,651 | 8/1925 | Codding | 58—140 |
| 2,426,546 | 8/1947 | Boswell | 58—140 X |
| 2,478,865 | 8/1949 | Fiechter | 58—140 X |
| 2,671,309 | 3/1954 | Marti et al. | 58—140 |
| 2,920,441 | 1/1960 | Fiechter | 58—140 |

FOREIGN PATENTS

| 482,048 | 11/1951 | Italy. |
| 283,123 | 9/1952 | Switzerland. |
| 286,182 | 2/1953 | Switzerland. |
| 316,074 | 10/1956 | Switzerland. |
| 321,192 | 6/1957 | Switzerland. |

RICHARD B. WILKINSON, *Primary Examiner.*

STANLEY A. WAL, *Assistant Examiner.*